United States Patent [19]

Fuchs et al.

[11] Patent Number: 5,404,970
[45] Date of Patent: Apr. 11, 1995

[54] SPOT-TYPE DISC BRAKE WITH HOLDING DEVICE FOR WARNING CONTACT PLUG

[75] Inventors: Elmar Fuchs, Darmstadt; Hermann Jungmann, Mörfelden; Josef Löffler, Frankfurt am Main; Holger Güttich, Bad-Nauheim, all of Germany

[73] Assignee: Alfred Teves GmbH, Germany

[21] Appl. No.: 122,535

[22] PCT Filed: Apr. 2, 1992

[86] PCT No.: PCT/EP92/00730

§ 371 Date: Sep. 29, 1993

§ 102(e) Date: Dec. 13, 1993

[87] PCT Pub. No.: WO92/18787

PCT Pub. Date: Oct. 29, 1992

[30] Foreign Application Priority Data

Apr. 10, 1991 [DE] Germany .................. 41 11 605.4
Dec. 7, 1991 [DE] Germany .................. 41 40 390.8

[51] Int. Cl.$^6$ .................................................. B60T 17/22
[52] U.S. Cl. .................................................. 188/1.11
[58] Field of Search .................. 188/1.11, 73.35, 73.31; 116/208; 340/453, 454

[56] References Cited

U.S. PATENT DOCUMENTS

| 3,802,257 | 4/1974 | Jorenda et al. | 188/1.11 X |
| 4,183,012 | 1/1980 | Kimura | 340/52 A |
| 4,793,448 | 12/1988 | Bolenbaugh et al. | 188/73.35 X |
| 4,850,454 | 7/1989 | Korody | 188/1.11 |

FOREIGN PATENT DOCUMENTS

| 1941646 | 3/1971 | Germany | 188/1.11 |
| 2004970 | 9/1971 | Germany | 188/1.11 |
| 2132913 | 1/1980 | Germany | 188/1.11 |
| 3926437 | 2/1991 | Germany . | |
| 4027944 | 3/1992 | Germany . | |
| 2231928 | 2/1993 | United Kingdom . | |

Primary Examiner—Robert J. Oberleitner
Assistant Examiner—Peter M. Poon
Attorney, Agent, or Firm—Dykema Gossett

[57] ABSTRACT

In a spot-type disc brake assembly with an electric friction lining warning device and a bleeder screw, a warning contact plug is supported at the brake caliper by using a holder. The holder is fixedly attached to the bleeder screw and has tongues that abut against the brake caliper. The tongues are a safeguard against the holder rotating relative to the caliper and position the warning contact plug on the brake.

6 Claims, 2 Drawing Sheets

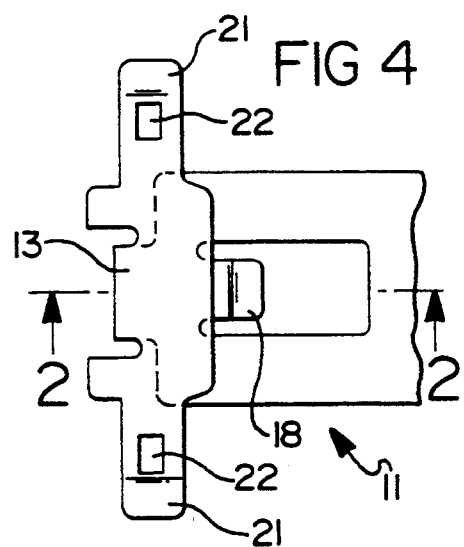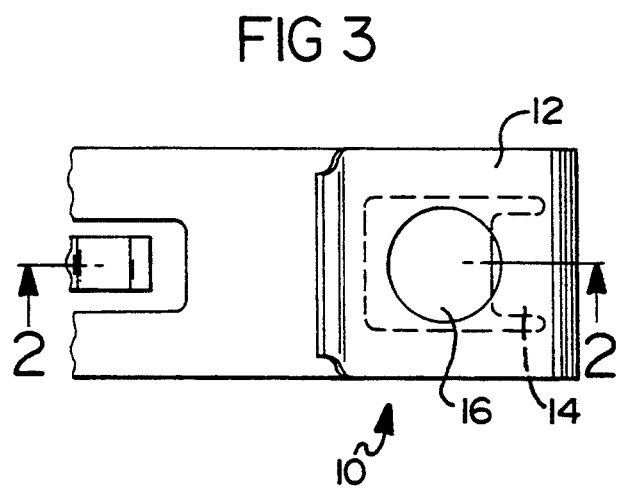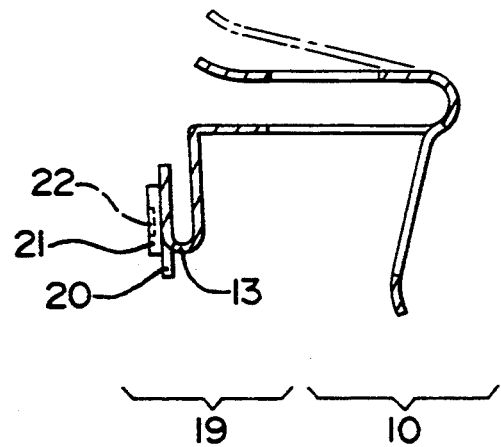

SPOT-TYPE DISC BRAKE WITH HOLDING DEVICE FOR WARNING CONTACT PLUG

FIELD OF THE INVENTION

The present invention is related to a spot-type disc brake with a friction lining warning device. More particularly, the present invention relates to a device for holding a plug attached to a sensor that senses the wear of the friction lining of a spot-type disc brake, so that the sensor can communicate through the plug to a remote warning indicator plugged thereinto.

BACKGROUND OF THE INVENTION

While it is desirous to provide an auditory or visual indicator in the passenger compartment of a vehicle to warn of brake failure or damage due to excessive wearing of the brake liners, there is considerable difficulty in connecting electrical equipment to the brake assembly because of the confined space in which a disc brake assembly is disposed. One solution is to mount a warning contact plug to a holding angle which is screwed, on its part, to a projection of the brake housing. Anchoring the holding angle has, however, the disadvantage that additional costs associated with machining the projection to provide a threaded bore. Moulding a holding device to the brake housing projection may be uneconomical, for example, when a brake which is already being series manufactured has to be retrofitted with a warning contact plug.

OBJECT OF THE INVENTION

It is, therefore, the object of the invention to fix the warning contact plug to a particular type of brake in a predetermined position on the brake caliper, without carrying out any modifications at the brake housing itself.

SUMMARY OF THE INVENTION

To achieve this object, a holder for the warning contact plug is fastened to a bleeder screw of the brake caliper. The holder is furnished with tongues as a safeguard against the holder rotating relative to the brake caliper and to position the warning contact plug. This mode of fixation offers the advantage of not requiring additional fixing means or attachment hardware at the brake housing.

A particularly compact embodiment is expedient in case only a very restricted mounting space is available. The holder is bent to make the holder more compact.

Preferably, the holder is furnished with spring tongues having apertures for locking the warning contact plug to the holder in a simple manner.

As a preferred embodiment, the holder is made of a one-piece spring metal sheet. By this embodiment, the fabrication of the holder is particularly easy and cost effective.

The invention will be explained in more detail in the following detailed description of the preferred embodiments, making reference to the accompanying drawings.

BRIEF DESCRIPTION OF THE DRAWINGS

In the drawings:

FIG. 3 shows a fragmented top view of the fixing or attaching section of the holder;

FIG. 4 shows a fragment top view of the carrier arm of the holder; and

FIG. 5 shows, in cross-section, another embodiment of the holder.

DETAILED DESCRIPTION OF A PREFERRED EMBODIMENT

Figure 1:
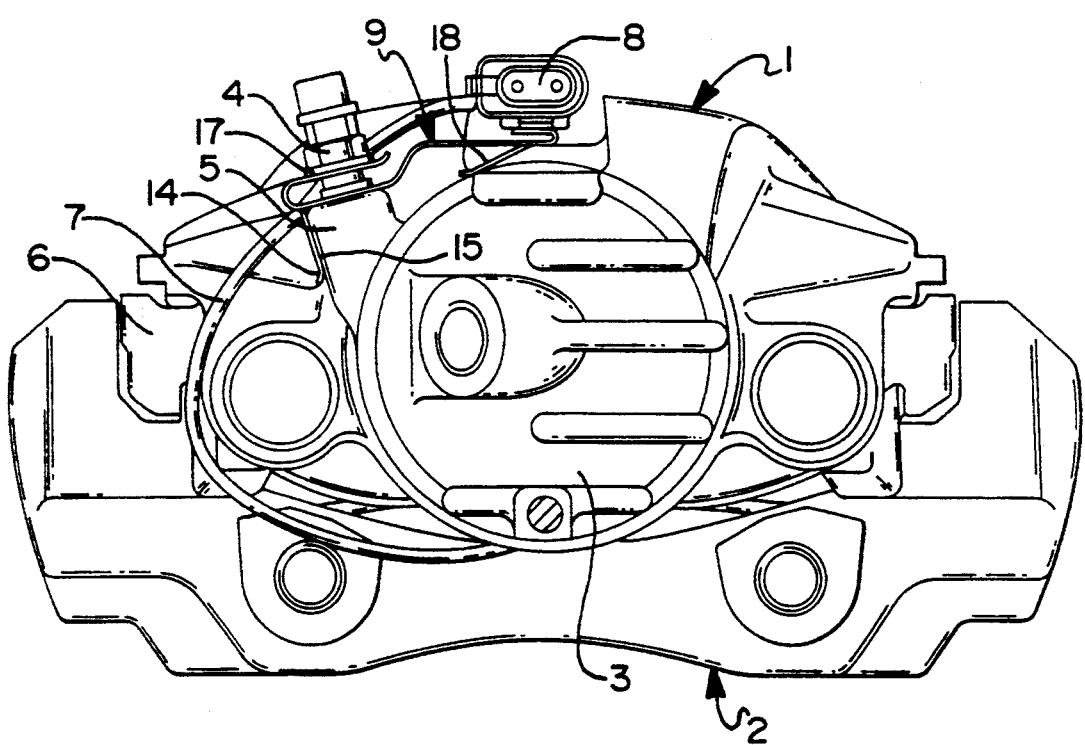
FIG. 1 shows a side view of a spot-type disc brake with a holder for a warning contact plug in accordance with the invention.

With reference to FIG. 1, a spot-type disc brake is substantially comprised of a brake caliper 1 which is floatingly supported at a brake carrier 2. The disc brake is furnished with a hydraulic actuating apparatus with a brake cylinder 3. The hydraulic actuating apparatus is provided with a bleeder screw 4. Bleeder screw 4 is positioned on a projection 5 of the brake caliper 1. A brake pad 6, which is visible only in part, is furnished with a lining wear sensor (not shown in the drawing). The lining wear sensor has a warning contact connected through an electric cable 7 to a warning contact plug 8. The warning contact plug is fastened to the brake caliper 1 by means of a holder 9.

Figure 2:
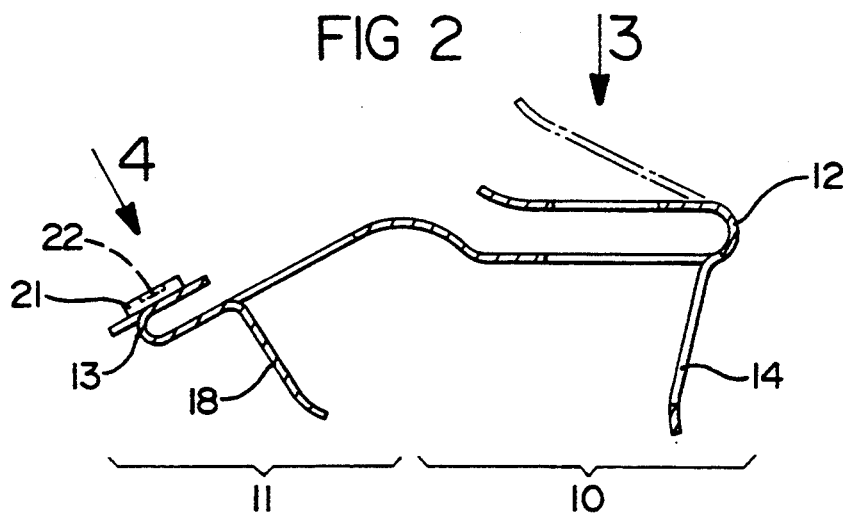
FIG. 2 shows a cross-section of the holder generally in the direction of arrows 2—2 in FIGS. 3 and 4.

The holder 9 is illustrated in more detail in FIGS. 2 to 4. It is stamped and shaped from a one piece strip of a spring metal sheet. The holder 9 is composed of a fixing or attaching section 10 and a carrier arm 11. The ends 12 and 13 of the sheet metal strip are each bent over to U-shape.

The end 12 is illustrated in FIG. 2 both in the assembled condition of the holder 9 anti (in dashed-dotted lines) in the unstressed condition of the disassembled holder 9. Out of the center of the fixing or attaching section 10 a securing tongue 14 is stamped and bent off. The securing tongue is intended for abutment against a plane lateral wall 15 of the projection 5 at the brake caliper 1. Furthermore, the end 12 is provided with a circular aperture 16 for the passage of the bleeder screw 4.

The holder 9 is attached, with its fixing or attaching section 10, to the brake caliper 1 by clamping the end 12 under a ring-shaped collar 17 of the bleeder screw 4. The holder 9 is secured against rotation about the axis of the screw 4 by the securing tongue 14 which abuts against the projection 5.

Out of the center of the carrier arm 11, a supporting tongue 18 is stamped and bent off. The supporting tongue 18 braces the carrier arm 11 of the assembled holder 9 against the brake caliper 1. By this structure the position of the warning contact plug is fixed and disturbing vibrations are reduced.

The holder 9 is thus attached or fixed to the brake caliper 1 without requiring additional hardware or machining of brake parts.

From the U-shaped end 13 of the carrier arm 11 two spring tongues 21 jut off laterally as can be particularly seen in FIG. 4. The spring tongues 21 are formed with rectangular apertures 22 and slightly angle upwardly away from the carrier arm. As the warning contact plug 8 is provided with two projections (not shown in the Figures) which are lockable in the apertures 22, the warning contact plug 8 may be fixedly attached to the holder 9 by being pressed in the direction A against the spring tongues 21, forcing the spring tongues 21 to elastically yield until the projections are forced into the apertures and become locked thereinto. The warning contact plug 8 will then be firmly attached at the spring tongues 21 and detachably, but firmly retained. In order to release the attachment of the warning contact plug 8 to the spring tongues 21, the spring tongues 21 need only to be pressed downwardly in the direction A, whereby the warning contact plug 8 will be released and may be withdrawn.

The invention is not limited to the embodiment just described. Rather, the scope of the claims are drawn to applications for all spot-type disc brakes, as well as to fixed-caliper brakes which are equipped with electric warning devices and bleeder screws. In this instance, the exact shape of the holder will have to be adapted to the brake caliper that is used.

For example, in another embodiment, illustrated in FIG. 5, the carrier arm 19 is additionally bent at a right angle at its U-shaped end 13, proximate the warning contact plug 8, so that the carrier arm 19 extends in the direction of brake caliper 1. In this way a very compact design is achieved which is adapted to restricted mounting space conditions. The supporting tongue 20 is intended for abutment against the brake caliper 1.

We claim:

1. A combination of a holder, a warning contact plug, and a bleeder screw for a spot-type disc brake, the combination comprising:

said holder shaped from a strip of spring metal sheet having two ends each bent over to U-shape, one of said ends being a fixing section and including at least one aperture lying generally within a plane normal to the direction of passage of the said bleeder screw therethrough and also including a securing tongue forming part of a wall of said aperture and positioned beside said aperture, said securing tongue angled off with respect to the plane within which said aperture lies, the other of said ends being configurated as an extending carrier arm for mounting the warning contact plug thereonto, said carrier arm having at least one angled-off supporting tongue.

2. The combination as claimed in claim 1, wherein said U-shaped end of said carrier arm has spring tongues jutting off laterally from said carrier arm and including apertures in which matching projections of the warning contact plug are lockable.

3. A holder for fixing a warning contact plug of an electric warning device indicating the wear of the friction lining at least one of brake pads of a spot-type disc brake also having a brake caliper, at least one friction lining wear sensor fixed to said at least one of brake pads and connected through at least one electric conductor to said warning contact plug, and a bleeded screw fixed on a projection of said brake caliper, said holder comprising:

a fixing section having an aperture for the passage of said bleeder screw and for being fastened by said bleeder screw to said brake caliper, said fixing section including at least one securing tongue directly abutting against a lateral wall of said projection of said brake caliper; and a carrier arm extending from said fixing section, bearing said warning contact plug, said carrier am including at least one supporting tongue supporting said carrier arm at said brake caliper.

4. The holder as claimed in claim 3, wherein said supporting tongue is bent from said carrier arm in a direction to abut against said brake caliper.

5. The holder as claimed in claim 3, wherein said carrier arm has a U-shaped end and spring tongues extending laterally from said carrier arm, said spring tongues having apertures for receiving and locking thereinto matching projections of said warning contact plug.

6. The holder as claimed in claim 5, wherein said holder is made from a one-piece spring metal sheet.

* * * * *